United States Patent
Kimura

(10) Patent No.: US 11,012,013 B2
(45) Date of Patent: May 18, 2021

(54) CONTROL DEVICE OF MOTOR, CONTROL SYSTEM, AND CONTROL METHOD

(71) Applicants: Kabushiki Kaisha Toshiba, Tokyo (JP); Toshiba Electronic Devices & Storage Corporation, Tokyo (JP)

(72) Inventor: Hideki Kimura, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 21 days.

(21) Appl. No.: 16/353,246

(22) Filed: Mar. 14, 2019

(65) Prior Publication Data
US 2020/0091846 A1 Mar. 19, 2020

(30) Foreign Application Priority Data
Sep. 18, 2018 (JP) .............................. JP2018-174042

(51) Int. Cl.
| | | |
|---|---|---|
| *H02P 6/28* | (2016.01) | |
| *H02K 11/27* | (2016.01) | |
| *H02K 11/33* | (2016.01) | |
| *H02P 8/12* | (2006.01) | |

(52) U.S. Cl.
CPC .............. *H02P 6/28* (2016.02); *H02K 11/27* (2016.01); *H02K 11/33* (2016.01); *H02P 8/12* (2013.01)

(58) Field of Classification Search
CPC .. H02P 6/28; H02P 8/12; H02K 11/27; H02K 11/33
See application file for complete search history.

(56) References Cited

U.S. PATENT DOCUMENTS

| | | | |
|---|---|---|---|
| 7,119,508 B2 | 10/2006 | Kurosawa et al. | |
| 2006/0028161 A1* | 2/2006 | Yamamoto | ............... H02P 6/10 318/432 |
| 2013/0043817 A1* | 2/2013 | Shibuya | ................. H02P 6/182 318/400.33 |
| 2014/0217940 A1* | 8/2014 | Kawamura | .......... B62D 5/0481 318/400.26 |

FOREIGN PATENT DOCUMENTS

| | | |
|---|---|---|
| JP | 2004-297904 A | 10/2004 |
| JP | 2008-236814 A | 10/2008 |
| JP | 4585358 B2 | 11/2010 |
| JP | 2015-202014 A | 11/2015 |

* cited by examiner

*Primary Examiner* — Cortez M Cook
(74) *Attorney, Agent, or Firm* — White & Case LLP

(57) ABSTRACT

According to one embodiment, there is provided a control device including a drive circuit and a control circuit. The drive circuit includes a plurality of transistors and a current determination circuit. The plurality of transistors is electrically connected in parallel to each other between a first node and a second node. The first node is connected to a power supply circuit. The second node is connected to a DC motor. The current determination circuit determines a current flowing between the first node and the second node. The control circuit generates a control signal to control a number of transistors to be turned on among the plurality of transistors in accordance with the determined current. The drive circuit drives the DC motor using a current in response to the control signal.

18 Claims, 7 Drawing Sheets

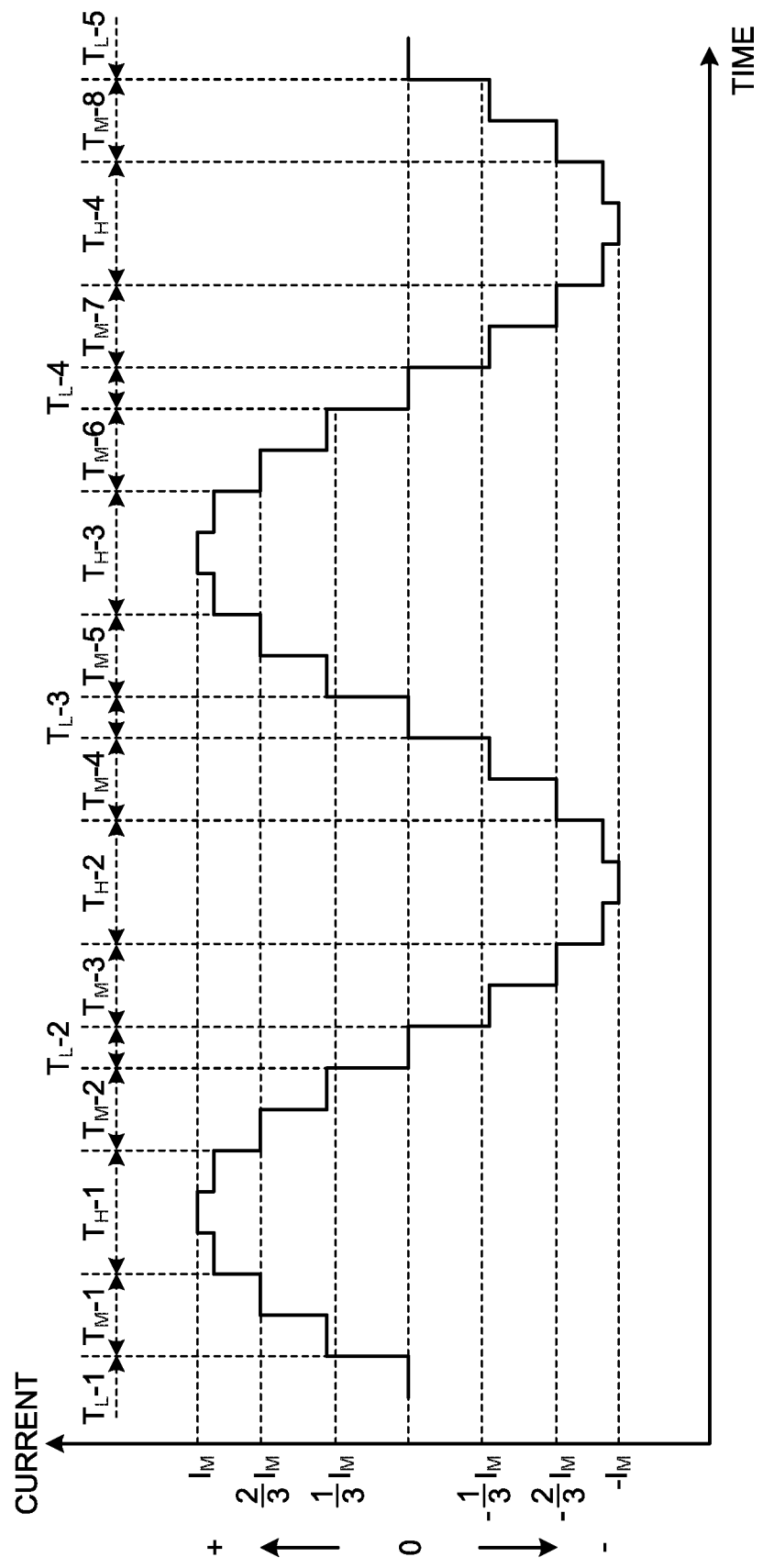

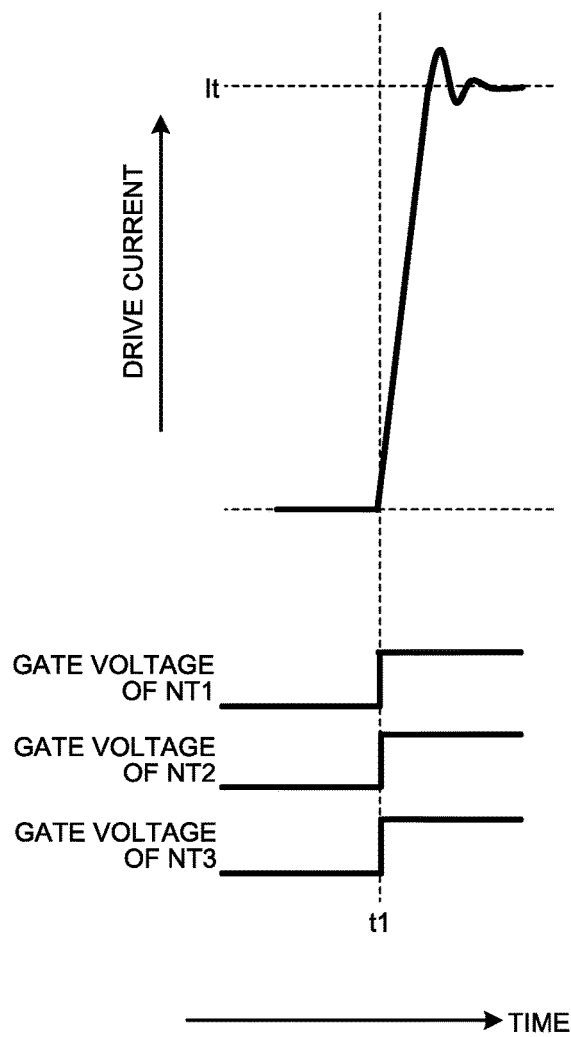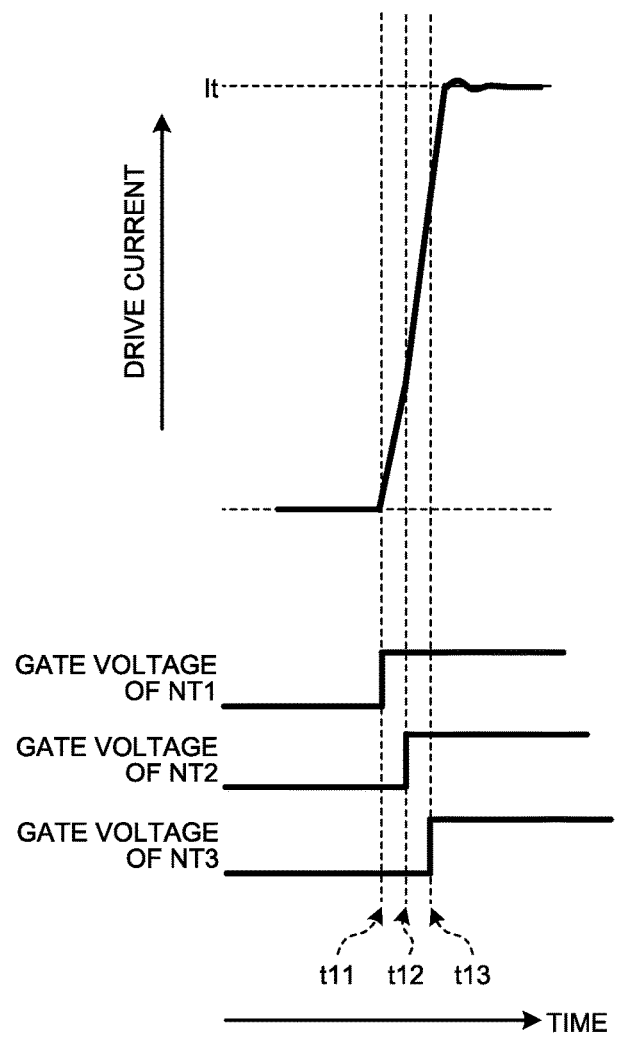

CONTROL DEVICE OF MOTOR, CONTROL SYSTEM, AND CONTROL METHOD

CROSS-REFERENCE TO RELATED APPLICATIONS

This application is based upon and claims the benefit of priority from Japanese Patent Application No. 2018-174042, filed on Sep. 18, 2018; the entire contents of which are incorporated herein by reference.

FIELD

Embodiments described herein relate generally to a control device of a motor, a control system, and a control method.

BACKGROUND

A control device of a DC motor controls a current flowing through the DC motor. At this time, it is desirable to properly control the current.

Conventionally, there is a case where a current value is determined based on a voltage across both ends of an external resistor element added between a control device and a power supply circuit in order to perform driving control of the DC motor. In this case, there is a possibility that power consumed by the external resistor element causes a decrease of power efficiency in the driving control of the DC motor. In addition, it may be difficult to secure a space to dispose the external resistor element due to a requirement for a compact size of a device.

BRIEF DESCRIPTION OF THE DRAWINGS

FIG. 5 is a waveform view illustrating an operation of a control system according to a second modification;

FIGS. 7A and 7B are waveform views illustrating an operation of a drive circuit according to a third modification.

DETAILED DESCRIPTION

In general, according to one embodiment, there is provided a control device including a drive circuit and a control circuit. The drive circuit includes a plurality of transistors and a current determination circuit. The plurality of transistors is electrically connected in parallel to each other between a first node and a second node. The first node is connected to a power supply circuit. The second node is connected to a DC motor. The current determination circuit determines a current flowing between the first node and the second node. The control circuit generates a control signal to control a number of transistors to be turned on among the plurality of transistors in accordance with the determined current. The drive circuit drives the DC motor using a current in response to the control signal.

Exemplary embodiments of a control system will be explained below in detail with reference to the accompanying drawings. The present invention is not limited to the following embodiments.

Embodiment

Figure 1:
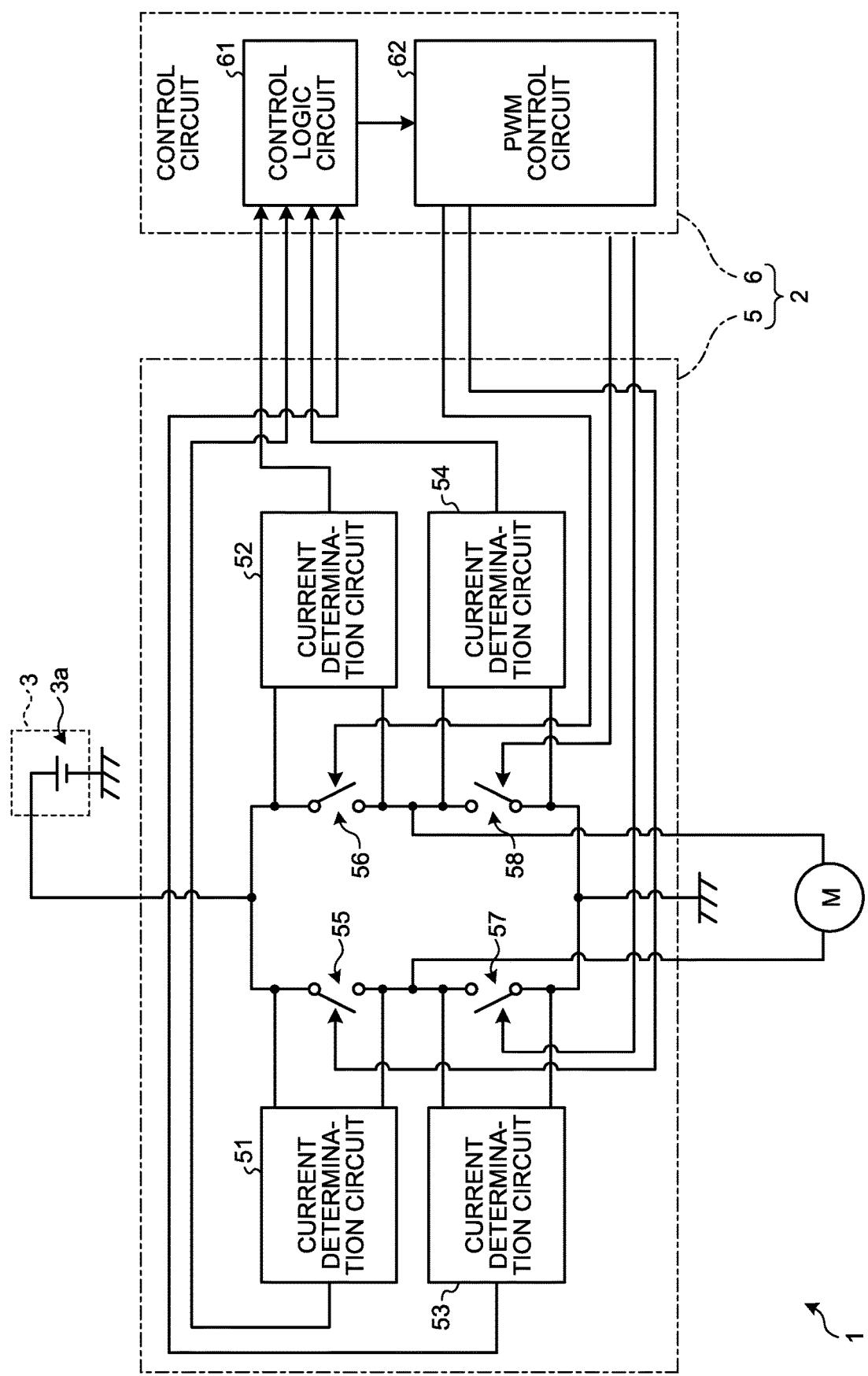
FIG. 1 is a diagram illustrating a configuration of a control system according to an embodiment.

FIG. 1 is a diagram illustrating a configuration of a control system 1 according to the embodiment. The control system 1 performs drive control of a DC motor M.

The control system 1 performs a resistor-less current determination on the DC motor M functioning as an L load without using an external resistor element. That is, the control system 1 determines a current (drive current) flowing through the DC motor M and performs constant current control based on a determination result. The constant current control is performed by determining a voltage across both ends of a drive switch and controlling the determined current to be approximate to a predetermined target current.

Figure 2:
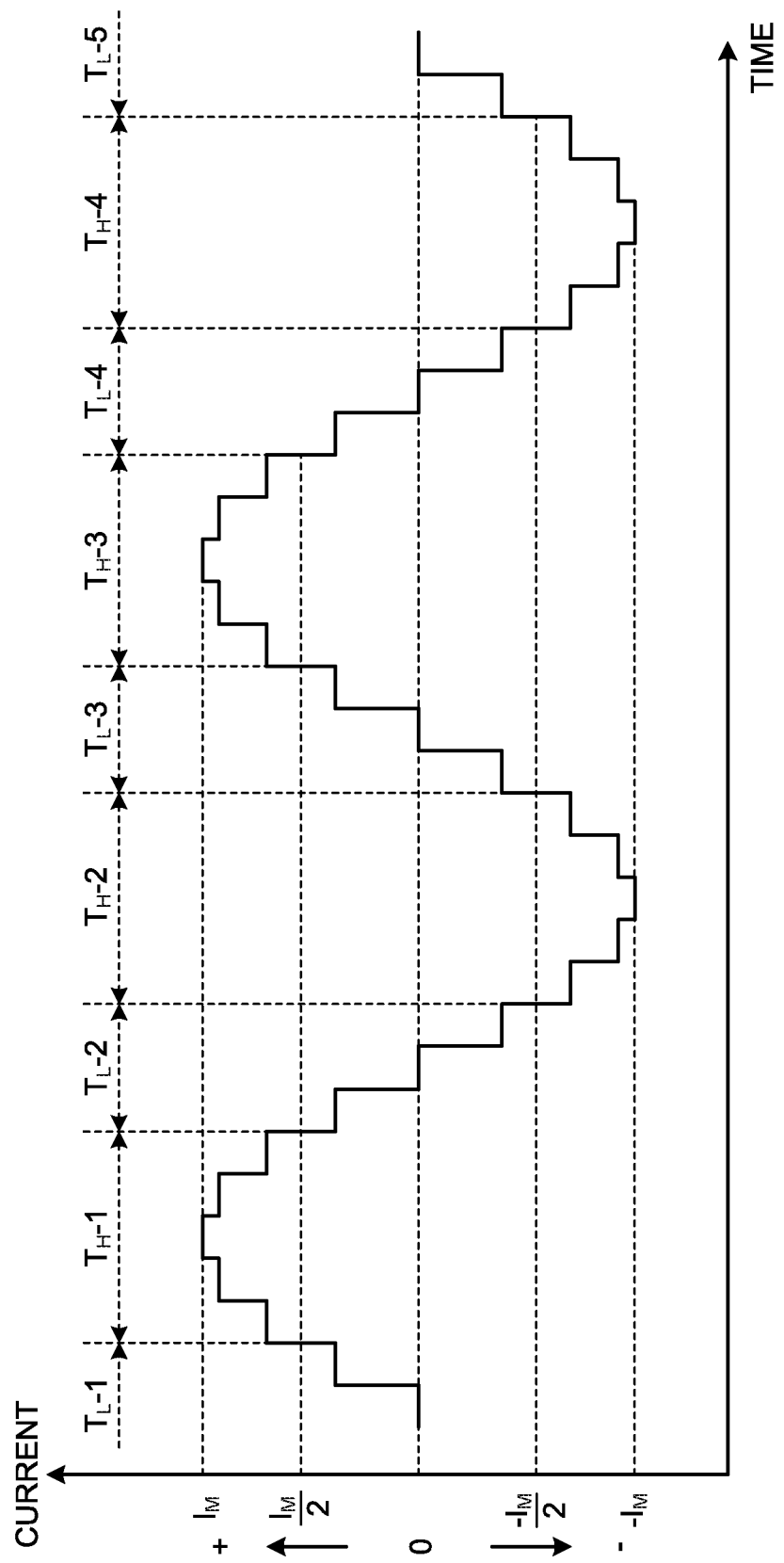
FIG. 2 is a waveform view illustrating an operation of the control system according to the embodiment.

For example, the control system 1 controls the current flowing through the DC motor M in accordance with a pseudo-sinusoidal control waveform pattern as illustrated in FIG. 2. FIG. 2 is a waveform view illustrating an operation of the control system 1. Such control is driving control to obtain a current waveform pattern that is approximate to a sinusoidal wave in a pseudo manner while changing a target current in a stepwise manner, and can be called micro-step driving. It is desirable to determine the drive current of the DC motor with high accuracy in order to perform the micro-step driving by the resistor-less current determination.

However, as the performance of the transistor as the drive switch in the drive circuit becomes higher and an operating voltage becomes lower, it may be difficult to secure the determination accuracy of the drive current in a region where a current amplitude is small in the control waveform pattern. When low-current driving is required for the DC motor M, it becomes more and more difficult to secure the determination accuracy of the drive current.

For example, when the current determination circuit is configured using a circuit having an offset voltage such as a comparator, the offset voltage of the current determination circuit becomes relatively larger than a control target voltage (a voltage value corresponding to a target current) in the region where the current amplitude is small. Thus, in the region where the current amplitude is small, the current determination circuit may determine that a value of the voltage across both the ends of the drive switch has reached the target voltage with a voltage value greater by a value corresponding to the offset voltage than the target voltage so that an error of the current determination may increase. In this manner, an actual waveform pattern of a motor current is offset in the region where the current amplitude is small and becomes a waveform pattern diverging from the pseudo sinusoidal wave with respect to a control waveform pattern, and thus, noise and/or vibration can be greatly generated by the DC motor.

In the present embodiment, the drive switch in the drive circuit 5 is configured by parallel connection of the plurality of transistors. The number of transistors to be turned on is restricted so that the voltage across both the ends appears large in the region where the current amplitude is small, thereby improving the accuracy of current determination.

Specifically, the control system 1 includes a control device 2 and a power supply circuit 3. The power supply circuit 3 includes a voltage source 3a. The control device 2 is connected to the power supply circuit 3 and the DC motor M, and controls the driving of the DC motor M. The control device 2 has a drive circuit 5 and a control circuit 6. The drive circuit 5 is mounted as a motor coil driver (MCD). The control circuit 6 can be implemented as a microcontroller unit (MCU). The control circuit 6 has a control logic circuit 61 and a PWM control circuit 62. The DC motor M is, for example, a stepping motor, but may be a DC brush motor or a DC brushless motor.

The drive circuit 5 includes a plurality of current determination circuits 51 to 54 and a plurality of drive switches 55 to 58. The drive switches 55 to 58 can be configured as H-bridge circuits. A control terminal of each of the drive switches 55 to 58 is connected to the PWM control circuit 62, and one end thereof is connected to the DC motor M. The other ends of the drive switches 55 and 56 are connected to the power supply circuit 3. The other ends of the drive switches 57 and 58 are connected to a ground potential.

Each of the current determination circuits 51 to 54 is electrically connected to both ends of the corresponding drive switch among the drive switches 55 to 58. The respective current determination circuits 51 to 54 determine the magnitude of each current flowing through the drive switches 55 to 58 using voltages across both the ends of the drive switches 55 to 58.

Figure 3A:
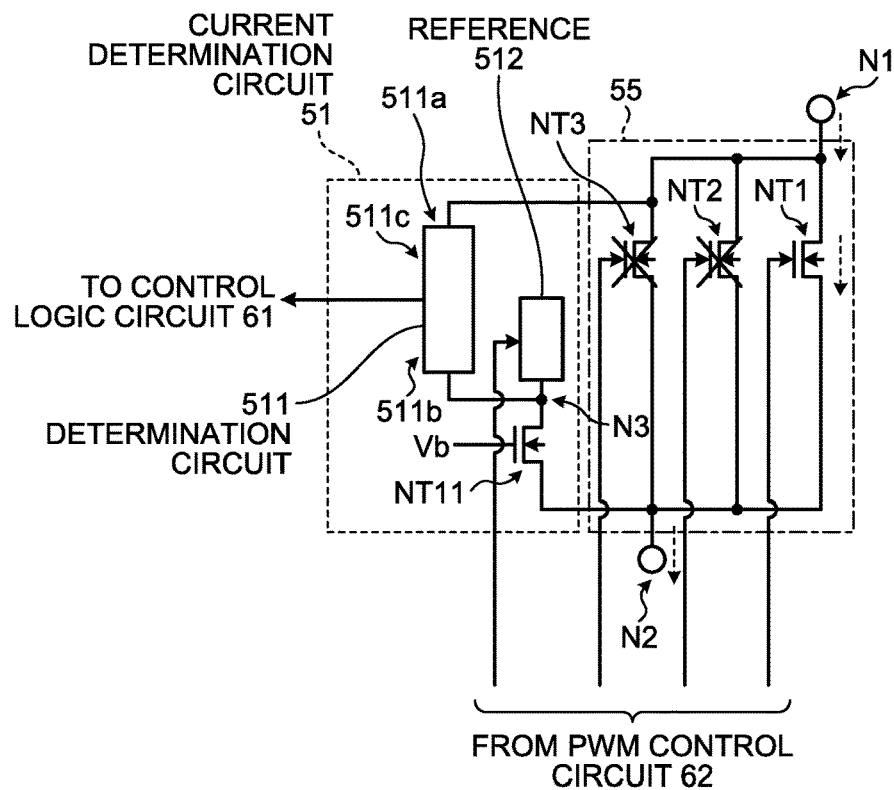
FIGS. 3A and 3B are diagrams illustrating configurations and operations of a current determination circuit and a drive switch according to the embodiment.

FIG. 3A is a diagram illustrating configurations and operations of the current determination circuit 51 and the drive switch 55. The drive switch 55 includes a node N1, a node N2, and a plurality of transistors NT1 to NT3. The node N1 is connected to the power supply circuit 3. The node N2 can be connected to the DC motor M. The transistors NT1 to NT3 are electrically connected in parallel to each other between the node N1 and the node N2. Each of the transistors NT1 to NT3 may be configured of an NMOS transistor. The respective transistors NT1 to NT3 have drains connected to the node N1, sources connected to the node N2, and gates connected to the PWM control circuit 62.

The current determination circuit 51 determines a current flowing between the node N1 and the node N2, performs determination on whether the determined current exceeds a target current, and outputs a determination result. The current determination circuit 51 includes a transistor (replica transistor) NT11, a determination circuit 511, and a reference current source 512. The transistor NT11 has a dimension (=W/L: W is a gate width, L is a gate length) corresponding to the transistors NT1 to NT3, and can operate with an on-resistance corresponding to the transistors NT1 to NT3. The transistor NT11 has a drain connected to the reference current source 512, a source connected to the node N2, and a gate connected to a bias potential Vb. The bias potential Vb is adjusted such that the transistor NT11 operates in a linear region. To the reference current source 512, a control signal to generate a reference current corresponding to a target current (see FIG. 2) is supplied from the PWM control circuit 62. As a result, a target voltage corresponding to the target current appears at a node N3 between the reference current source 512 and the transistor NT11.

The determination circuit 511 has input nodes 511a and 511b and an output node 511c. The determination circuit 511 can be configured as, for example, a comparator. In the determination circuit 511, the input node 511a is connected to the node N1, the input node 511b is connected to the node N3, and the output node 511c is connected to the control logic circuit 61. The determination circuit 511 supplies a signal based on a result of comparing a voltage of the node N1 and a voltage of the node N3 to the control logic circuit 61. For example, the determination circuit 511 supplied an H-level signal to the control logic circuit 61 when the voltage of the node N1 exceeds the voltage of the node N3 and supplies an L-level signal to the control logic circuit 61 when the voltage of the node N1 falls below the voltage of the node N3.

Incidentally, the current determination circuit 52 and the drive switch 56 also have the same configurations. Configurations of the current determination circuit 53 and the drive switch 57, and configurations of the current determination circuit 54 and the drive switch 58 are the same as the above-described configurations except for a difference that the node N1 is connected to the DC motor M, and the node N2 is connected to the ground potential.

In the control logic circuit 61, the control waveform pattern as illustrated in FIG. 2 is set in advance or the control waveform pattern as illustrated in FIG. 2 is generated by performing an operation using a predetermined parameter is performed from a waveform pattern of a square wave. In accordance with determination results of the current determination circuits 51 to 54 (that is, comparison results of the determination circuit 511) and the control waveform pattern illustrated in FIG. 2, the control logic circuit 61 instructs a target current value and the number of transistors to be turned on among the transistors NT1 to NT3 to the PWM control circuit 62.

The control logic circuit 61 instructs the PWM control circuit 62 to turn on the transistors NT1 to NT3 of the drive switches 55 to 58. For example, assuming that an absolute value of a maximum amplitude in a control current is $I_M$ (>0), an amplitude absolute value of the control current is smaller than $I_M/2$ in periods $T_L$-1, $T_L$-2, $T_L$-3, $T_L$-4, and $T_L$-5 illustrated in FIG. 2. At this time, assuming that a direction from the left to the right in FIG. 1 is a positive side of a motor current, the number of transistors to be turned on by the drive switches 55 and 58 is restricted to one (see FIG. 3A) on the positive side of the amplitude of the control current, and all the transistors are maintained in the off-state in the drive switches 56 and 57. When the amplitude of the control current is on a negative side, the number of transistors to be turned on in the drive switches 56 and 57 is restricted to one, and all the transistors are maintained in the off state in the drive switches 55 and 58.

As a result, a resistance across both ends of the drive switch increases in a region where the amplitude absolute value of the control current is small, and the voltage appearing at both the ends of the drive switch can be increased, and thus, it is possible to easily improve the determination accuracy of the drive current by the current determination circuit 54.

Figure 3B:
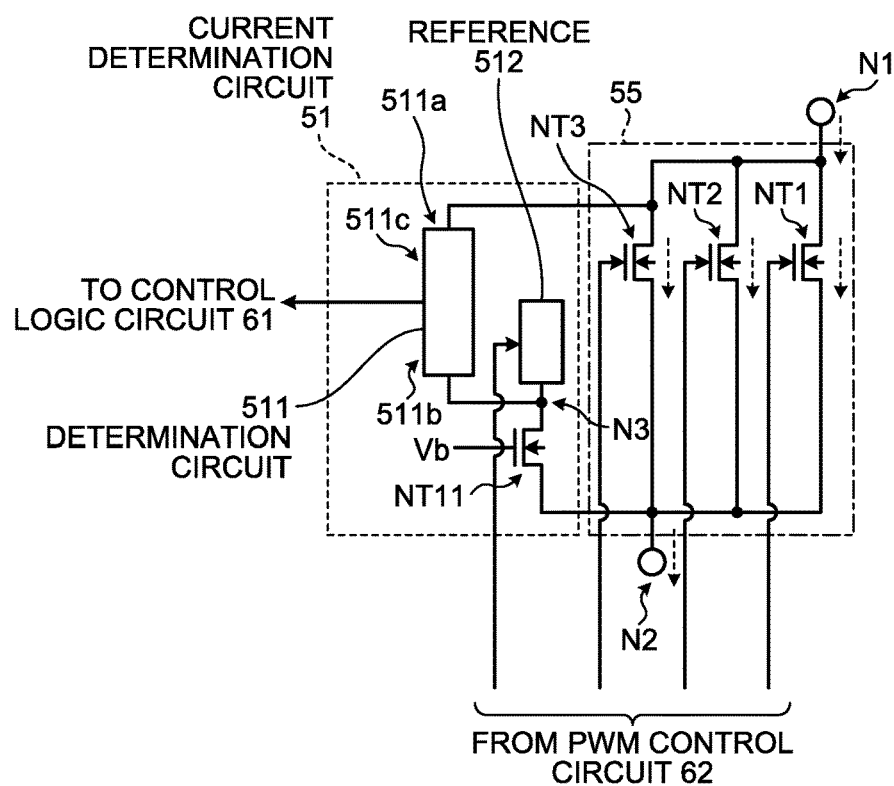

On the other hand, the amplitude absolute value of the control current is larger than $I_M/2$ in periods $T_H$-1, $T_H$-2, $T_H$-3, and $T_H$-4. At this time, when the amplitude of the control current is on the positive side, all of the transistors in the drive switches 55 and 58 are turned on (see FIG. 3B), and all the transistors are maintained in the off state in the drive switches 56 and 57. When the amplitude of the control current is on the negative side, all the transistors are turned on in the drive switches 56 and 57, and all the transistors are maintained in the off state in the drive switches 55 and 58.

The PWM control circuit 62 generates a control signal for the target current value and a PWM control signal for turning on/off the transistors NT1 to NT3 in the respective drive switches 55 to 58 in response to the instruction from the control logic circuit 61 and supplies the generated signals to the drive circuit 5. That is, the PWM control circuit 62 supplies the control signal for the target current value to each of the reference current sources 512 and supplies the PWM control signal to each of the transistors NT1 to NT3.

As described above, in the present embodiment, the drive switch in the drive circuit 5 is configured by parallel connection of the plurality of transistors in the control device 2 so that the number of transistors to be turned on is restricted in the region where the current amplitude is small and the voltage across both the ends appears to be large. Thus, the accuracy of the current determination can be improved, and the current flowing through the DC motor M can be appropriately controlled. Therefore, it is possible to satisfy the requirement of low-current driving for the DC motor M and to easily expand a dynamic range which is a controllable current range for the DC motor M (for example, to the low-current side).

Incidentally, the number of transistors connected in parallel with each other is not limited to three in each of the drive switches 55 to 58, and may be two or four, or more.

Alternatively, at least one current determination circuit may be disposed in a current path of the motor current in the drive circuit 5. For example, the drive circuit 5 may have a configuration in which the current determination circuits 51 and 52 are omitted or may have a configuration in which the current determination circuits 53 and 54 are omitted.

Although the case where the control system 1 performs the current determination with no resistor has been exemplified in the embodiment, the concept of the present embodiment can also be applied to a case where current determination is performed using an external resistor.

Figure 4A:
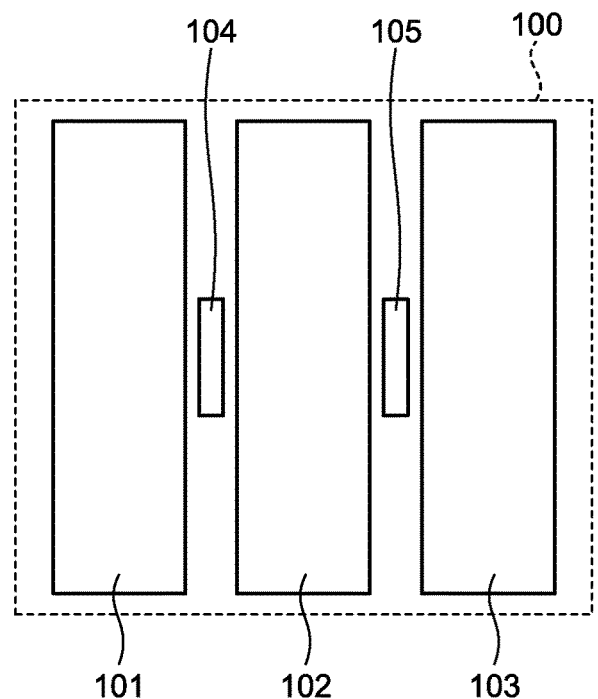
FIGS. 4A and 4B are views illustrating mounting configurations of a current determination circuit and a drive switch according to a first modification.
Figure 4B:
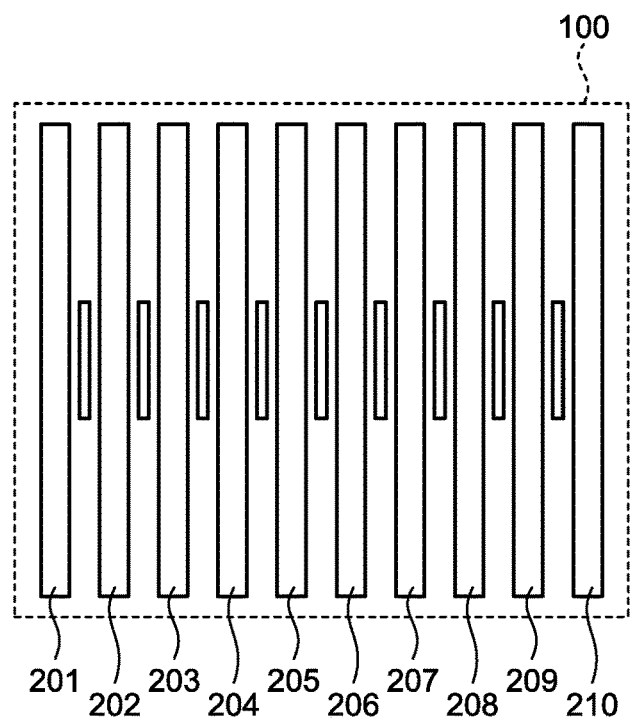

Next, a first modification of the embodiment will be described. FIGS. 4A and 4B are views illustrating mounting configurations of a current determination circuit and a drive switch in the drive circuit 5. For example, there is a case where a mounting region 100 in which a circuit is to be disposed is defined in advance according to a requirement for a compact size of a device. In this case, in the current determination circuit 51 and the drive switch 55, the transistors NT1 to NT3 are disposed in each of regions 101 to 103 obtained by dividing the inside of the mounting region 100 into three, and a configuration corresponding to the current determination circuit 51 is disposed to be divided between regions 104 and 105 among the regions 101 to 103 as illustrated in FIG. 4A. Each of the regions 101 to 103 can be configured by, for example, a gate array and can operate equivalently as one transistor.

Alternatively, the region 100 may be divided into ten regions for each configuration of the transistors NT1 to NT3 and one or more regions among regions 201 to 210 may be arbitrarily allocated as illustrated in FIG. 4B. For example, the region 201 is allocated to the transistor NT1, the regions 202 to 204 are allocated to the transistor NT2, and the regions 205 to 210 are allocated to the transistor NT3. Thus, the dimensions of the transistors NT1 to NT3 in the drive switch can be appropriately adjusted. Even in this case, the configuration corresponding to the current determination circuit can be disposed to be divided between the regions allocated to the transistors.

Figure 6A:
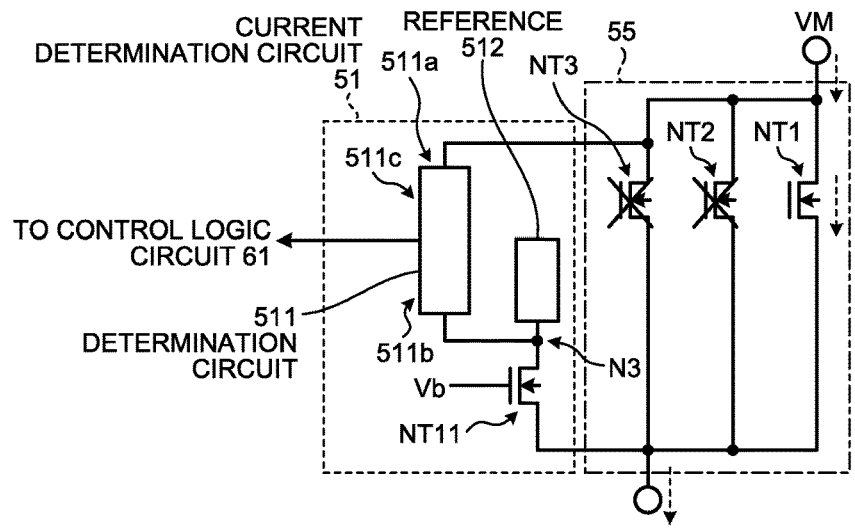
FIGS. 6A to 6C are diagrams illustrating operations of a current determination circuit and a drive switch according to the second modification.
Figure 6B:
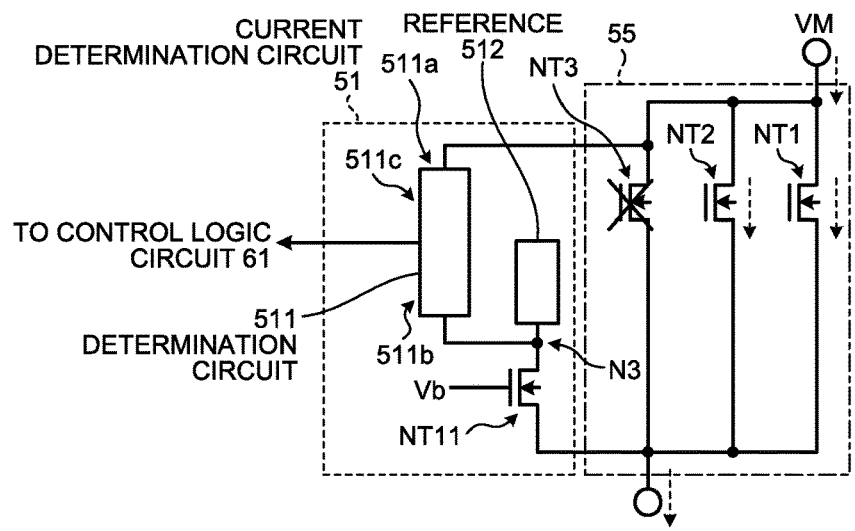
Figure 6C:
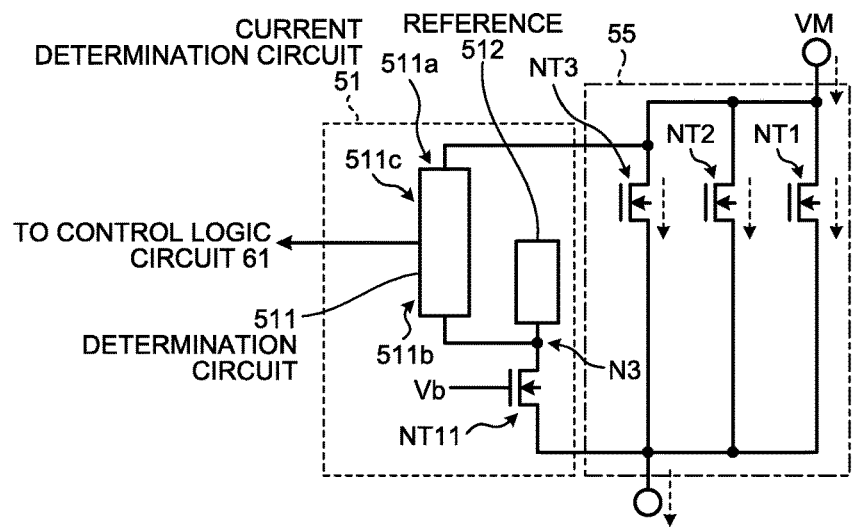

Next, a second modification of the embodiment will be described. The control circuit 6 may control the number of transistors to be turned on in the drive switches 55 to 58 in multiple stages. FIG. 5 is a waveform view illustrating an operation of a control system according to a second modification; FIGS. 6A to 6C are diagrams illustrating operations of a current determination circuit and a drive switch according to the second modification; and For example, an amplitude absolute value of a control current is smaller than $\frac{1}{3} \times I_M$ in periods $T_L$-1, $T_L$-2, $T_L$-3, $T_L$-4, and $T_L$-5 illustrated in FIG. 5. At this time, assuming that a direction from the left to the right is a positive side of a motor current, the number of transistors to be turned on by the drive switches 55 and 58 is restricted to one (FIG. 6A) on the positive side of the amplitude of the control current, and all the transistors are maintained in the off-state in the drive switches 56 and 57. When the amplitude of the control current is on a negative side, the number of transistors to be turned on in the drive switches 56 and 57 is restricted to one (FIG. 6A), and all the transistors are maintained in the off state in the drive switches 55 and 58.

As a result, a resistance across both ends of the drive switch increases in a region where the amplitude absolute value of the control current is small, and the voltage appearing at both the ends of the drive switch can be increased. Accordingly, the determination accuracy of the drive current by the current determination circuit 54 can be easily improved.

In periods $T_M$-1, $T_M$-2, $T_M$-3, $T_M$-4, $T_M$-5, $T_M$-6, $T_M$-7, and $T_M$-8 illustrated in FIG. 5, the amplitude absolute value of the control current is larger than $\frac{1}{3} \times I_M$ and smaller than $\frac{2}{3} \times I_M$. At this time, when the amplitude of the control current is on the positive side, the number of transistors to be turned on in the drive switches 55 and 58 is restricted to two (FIG. 6B), and all the transistors are maintained in the off state in the drive switches 56 and 57. When the amplitude of the control current is on a negative side, the number of transistors in the drive switches 56 and 57 is restricted to two, and all the transistors are maintained in the off state in the drive switches 55 and 58.

As a result, a resistance across both ends of the drive switch moderately increases in a region where the amplitude absolute value of the control current is moderate, and the voltage appearing at both the ends of the drive switch can be moderately increased. Accordingly, the determination accuracy of the drive current by the current determination circuit 54 can be easily improved.

On the other hand, the amplitude absolute value of the control current is larger than $\frac{2}{3} \times I_M$ in periods $T_H$-1, $T_H$-2, $T_H$-3, and $T_H$-4 illustrated in FIG. 5. At this time, when the amplitude of the control current is on the positive side, all of the transistors in the drive switches 55 and 58 are turned on (see FIG. 6C), and all the transistors are maintained in the off state in the drive switches 56 and 57. When the amplitude of the control current is on the negative side, all the transistors are turned on in the drive switches 56 and 57, and all the transistors are maintained in the off state in the drive switches 55 and 58.

In this manner, the number of transistors to be turned on is restricted in multiple stages based on the amplitude of the control current in the control device 2 in the second modification. The voltage at both ends appears to be large in the region where the current amplitude is small, and the voltage at both ends appears to be moderately large in the region where the current amplitude is moderate. As a result, the accuracy of the current determination can be further improved in the constant current control, and the current flowing through the DC motor M can be more appropriately controlled.

Alternatively, the control device 2 may sequentially drive the plurality of transistors in a region where a current amplitude is large as a third modification. FIGS. 7A and 7B are waveform views illustrating an operation of a drive circuit according to a third modification.

For example, as illustrated in FIG. 7A, the respective transistors NT1 to NT3 can be collectively turned on at a timing t1 at which the transistors need be turned on. In this case, a waveform of a drive current reaches a target value It, and then, tends to overshoot beyond the target value It. When a control current of the DC motor M is lowered in consideration of such overshoot, a dynamic range which is a controllable current range for the DC motor M can be restricted.

On the other hand, the plurality of transistors NT1 to NT3 is sequentially turned on in the third modification as illustrated in FIG. 7B. In the case of FIG. 7B, the transistor NT1 is turned on at a timing t11, the transistor NT2 is turned on at a timing t12, and the transistor NT3 is turned on at a timing t13. As a result, a waveform in which a rise of the drive current is slow but gradually rises steeply is obtained, and the waveform can be stabilized in the vicinity of the target value It after reaching the target value It. As a result, the overshoot of the waveform can be suppressed so that the control current of the DC motor M can be set to a large value. Therefore, it is possible to satisfy the requirement of high-current driving for the DC motor M and to easily expand a dynamic range which is a controllable current range for the DC motor M (for example, to the high-current side).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
a drive circuit including a plurality of transistors and a current determination circuit, the plurality of transistors being electrically connected in parallel to each other between a first node and a second node, the first node being connected to a power supply circuit, the second node being connected to a DC motor, the current determination circuit determining a total current flowing between the first node and the second node; and
a control circuit that generates a control signal to control a number of transistors to be turned on among the plurality of transistors in accordance with the determined total current,
wherein the drive circuit drives the DC motor using a current in response to the control signal, and
the control circuit
turns on a first number of transistors among the plurality of transistors in a first period,
turns on a second number of transistors, smaller than the first number, among the plurality of transistors in a second period, and
turns on a third number of transistors, smaller than the second number, among the plurality of transistors in a third period.

2. The control device according to claim 1, wherein
the plurality of transistors includes a first transistor and a second transistor, and
the control circuit turns on the first transistor at a first timing and turns on the second transistor at a second timing after the first timing in the first period.

3. The control device according to claim 2, wherein
the plurality of transistors further includes a third transistor, and
the control circuit turns on the third transistor at a third timing after the second timing in the first period.

4. The control device according to claim 1, wherein
the current determination circuit determines whether a total current flowing between the first node and the second node exceeds a target total current, and outputs a determination result to the control circuit.

5. The control device according to claim 4, wherein
the control circuit controls the target total current in accordance with a control waveform pattern.

6. The control device according to claim 1, wherein
the first period is a period during which a target total current between the first node and the second node is controlled to a first current value, and
the second period is a period during which the target total current between the first node and the second node is controlled to a second current value having a smaller absolute value than the first current value.

7. The control device according to claim 1, wherein
the first period is a period during which a target total current between the first node and the second node is controlled to a first current value,
the second period is a period during which the target current between the first node and the second node is controlled to a second current value having a smaller absolute value than the first current value, and
the third period is a period during which the target total current between the first node and the second node is controlled to a third current value having a smaller absolute value than the second current value.

8. The control device according to claim 1, wherein
the second period is a period before the first period,
the plurality of transistors includes a first transistor and a second transistor, and
the control circuit turns on the first transistor in the second period and turns on the first transistor and the second transistor in the first period.

9. The control device according to claim 1, wherein the second period is a period before the first period, the third period is a period before the second period, the plurality of transistors includes a first transistor, a second transistor, and a third transistor, and the control circuit turns on the first transistor in the third period, turns on the first transistor and the second transistor in the second period, and turns on the first transistor, the second transistor, and the third transistor in the third period.

10. The control device according to claim 1, wherein
the second period is a period after the first period,
the plurality of transistors includes a first transistor and a second transistor, and
the control circuit turns on the first transistor and the second transistor in the first period and turns on the first transistor in the second period.

11. The control device according to claim 1, wherein
the second period is a period after the first period,
the third period is a period after the second period,
the plurality of transistors includes a first transistor, a second transistor, and a third transistor, and
the control circuit turns on the first transistor, the second transistor, and the third transistor in the first period, turns on the first transistor and the second transistor in the second period, and turns on the first transistor in the third period.

12. The control device according to claim 2, wherein
the control circuit turns on the first transistor and the second transistor at an identical timing in the second period.

13. The control device according to claim 3, wherein
the control circuit turns on the first transistor, the second transistor, and the third transistor at an identical timing in the second period.

14. The control device according to claim 1, wherein
the plurality of transistors is disposed to be divided into a plurality of regions in a mounting region, and
a configuration corresponding to the current determination circuit is disposed to be divided among the plurality of regions.

15. The control device according to claim 1, wherein
the current determination circuit comprises:
a replica transistor having a dimension corresponding to each of the plurality of transistors;
a reference current source electrically connected to the replica transistor via a third node; and
a determination circuit that compares a voltage of the first node with a voltage of the third node and outputs a comparison result as the determination result to the control circuit.

16. The control device according to claim 15, wherein
the control circuit generates a current in accordance with a target total current in the reference current source.

17. A control system comprising:
a power supply circuit; and
the control device according to claim 1 disposed between the power supply circuit and a DC motor.

18. A control method comprising:
determining a total current flowing between a first node and a second node, the first node being connected to a power supply circuit, the second node being connected to a DC motor, a plurality of transistors being electrically connected in parallel between the first node and the second node;
generating a control signal to control a number of transistors to be turned on among the plurality of transistors in accordance with the determined total current; and
driving a DC motor with a current corresponding to the control signal, wherein
the driving includes
turning on a first number of transistors among the plurality of transistors in a first period,
turning on a second number of transistors, smaller than the first number, among the plurality of transistors in a second period, and
turning on a third number of transistors, smaller than the second number, among the plurality of transistors in a third period.

* * * * *